United States Patent [19]
Heckman

[11] Patent Number: 4,592,722
[45] Date of Patent: Jun. 3, 1986

[54] PROCESS AND APPARATUS FOR FORMING LIGHTWEIGHT INORGANIC AGGREGATE

[75] Inventor: Harold Heckman, Frazier Park, Calif.

[73] Assignee: Lightweight Processing Co., Glendale, Calif.

[21] Appl. No.: 618,834

[22] Filed: Jun. 8, 1984

[51] Int. Cl.[4] ............................................. C04B 20/06
[52] U.S. Cl. ........................ 432/13; 252/378 R; 252/378 P; 264/43; 264/DIG. 9; 264/DIG. 51
[58] Field of Search ................... 252/378 R, 378 P; 264/DIG. 9, 53, DIG. 51, 43; 423/13

[56] References Cited

U.S. PATENT DOCUMENTS

| | | |
|---|---|---|
| 1,802,959 | 4/1931 | Simonds . |
| 1,948,173 | 2/1934 | Hagan . |
| 2,498,355 | 2/1950 | Bomgren ................ 252/378 R X |
| 2,868,735 | 1/1959 | Myers ................ 252/378 R |
| 2,948,630 | 8/1960 | Holm ................ 252/378 R X |
| 3,394,463 | 7/1968 | Futer . |
| 3,511,843 | 5/1970 | Lewis . |
| 3,546,787 | 12/1970 | Horner et al. . |
| 3,619,435 | 11/1971 | Kepper ................ 264/DIG. 51 |
| 3,821,342 | 6/1974 | Hurd ................ 264/53 |
| 4,107,851 | 8/1978 | Takacs et al. . |
| 4,165,568 | 8/1979 | Gilbert et al. . |
| 4,233,024 | 11/1980 | Plass . |
| 4,301,749 | 11/1981 | Urquhart . |
| 4,316,718 | 2/1982 | Drugge . |
| 4,345,894 | 8/1982 | Smith et al. . |
| 4,349,969 | 9/1982 | Stewart et al. . |
| 4,397,102 | 8/1983 | Gamble et al. . |

*Primary Examiner*—Philip Anderson
*Attorney, Agent, or Firm*—Christie, Parker & Hale

[57] ABSTRACT

A method and apparatus for expanding particles of a lightweight aggregate material are disclosed. The apparatus comprises a housing having an upper chamber separated from a lower chamber by a partition having a plurality of openings. Hot air is introduced into the lower chamber and flows through the partition to fluidize particles introduced into the upper chamber. Means are provided for independently regulating the velocity of air through separate sections of the partition. Particles are introduced at the inlet end of the upper chamber. The particles are fluidized and transported toward the outlet end of the upper chamber by the air flow. The temperature of the air flow causes the particles to expand and become lighter. The velocity of the air flow through separate sections of the partition is adjusted to maintain uniform fluidization of the particle bed in the upper chamber.

18 Claims, 3 Drawing Figures

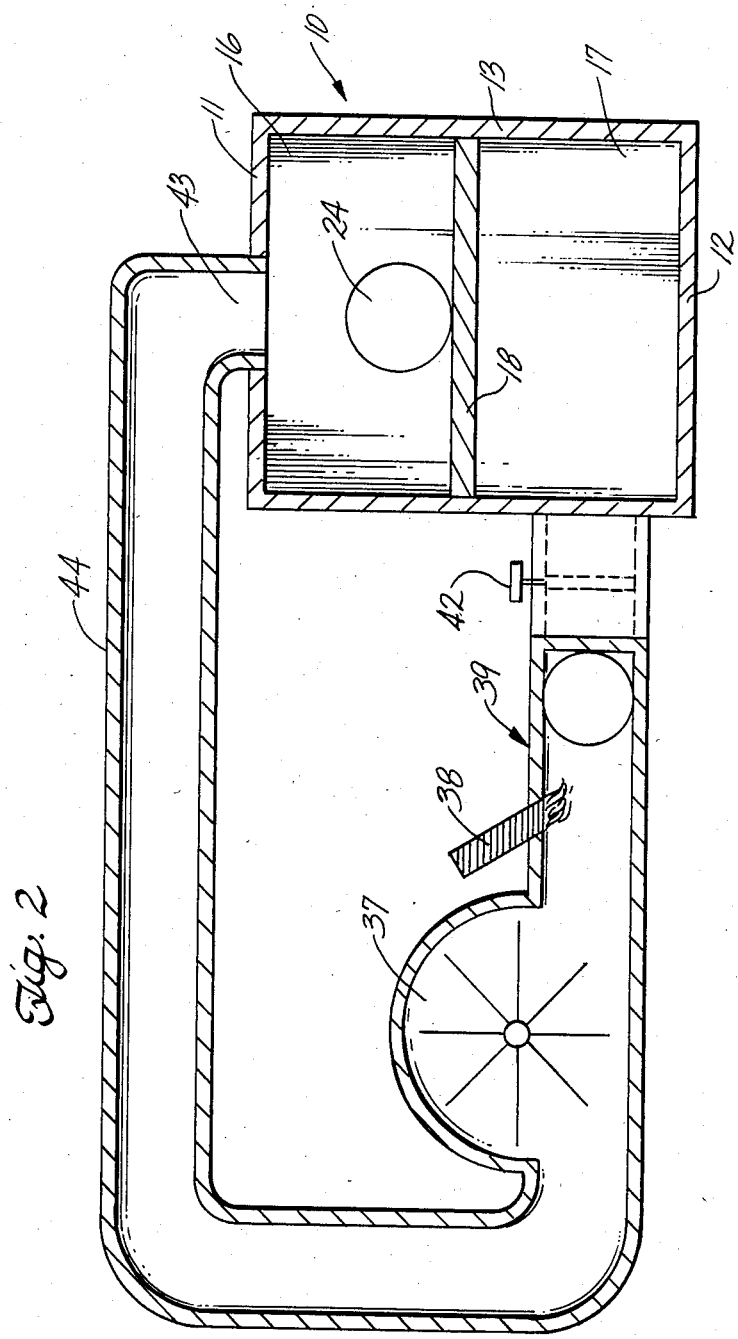

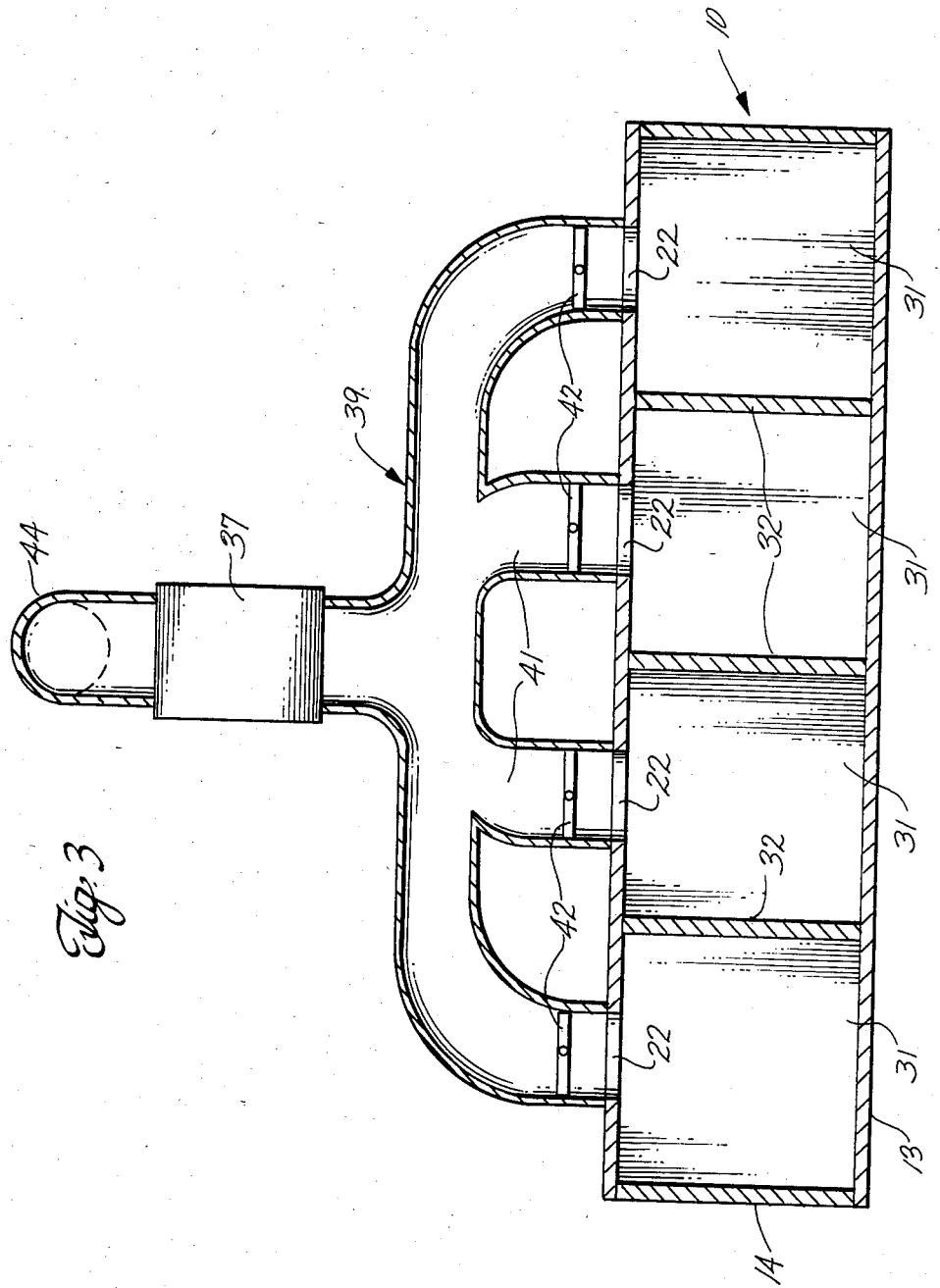

PROCESS AND APPARATUS FOR FORMING LIGHTWEIGHT INORGANIC AGGREGATE

FIELD OF THE INVENTION

This invention relates to lightweight aggregate used in concrete products and more particularly to a method and apparatus for expanding particles of an expandable material to thereby form lightweight aggregate.

BACKGROUND OF THE INVENTION

As a result of the demand for lighter building materials, lightweight inorganic aggregates have been used in concrete as a replacement for natural gravel and sand. Such light-weight inorganic aggregates include very light materials such as vermiculite and pearlite, which are used in plastics and insulating concretes; materials such as scoria and pumice, which are typically used in fill concretes; and expandable materials such as shale, clay, slate or slag, which are typically used in structural concretes.

Lightweight aggregate from such expandable materials is produced by heating particles of the material to a temperature wherein the material becomes plastic and the evolution of gas within the particles causes the particles to expand. To assure proper expansion, the particles are generally heated slowly, typically in a rotary kiln. In such a process, the particles are introduced into the upper end of the kiln, which is inclined. As the kiln rotates, the particles move toward the discharge end. A burner at the discharge end creates a flow of hot air through the kiln which contacts and heats the particles. By the time the particles reach the discharge end of the kiln, they have expanded.

Although conventional processes effectively expand such particles, they tend to be very time consuming. For example, in one process, shale particles must be heated in a rotary kiln for up to about 25 minutes. Such processes are also expensive to operate as a result of the vast amount of energy needed to heat the particles for such an extensive period. Accordingly, a need exists for a quicker, less expensive process for expanding particles of a lightweight aggregate material.

SUMMARY OF THE INVENTION

The present invention provides a method and apparatus for expanding particles of an expandable lightweight aggregate material to produce lightweight aggregate for use in concrete products and the like.

The method comprises introducing particles of an expandable lightweight aggregate material into a fluidizing chamber and fluidizing the particles with a stream of air. The air stream is maintained at a temperature sufficient to expand the particles. The particles are introduced at the inlet end of the fluidization chamber and fluidization of the particles causes the particles to move toward the outlet end. By the time the particles reach the outlet end of the chamber, the particles have contacted the hot air for a time sufficient for the particles to expand.

The expanded particles at the outlet end of the chamber are lighter or less dense than the non-expanded particles at the inlet end. Thus, the velocity of the air is regulated so that the velocity of the air contacting the expanded particles is less than the velocity of the air contacting the unexpanded particles to provide uniform fluidization of the particles.

An apparatus for expanding particles of lightweight aggregate material is also provided. The apparatus comprises a housing having an upper chamber, a lower chamber and a generally horizontally partition therebetween. The upper chamber comprises an inlet end into which particles of unexpanded material are introduced and an outlet end from from which expanded particles are removed. The lower chamber comprises at least one air inlet opening through which the lower chamber receives a stream of air.

The partition comprises openings which allow air introduced into the lower chamber to pass upwardly into the upper chamber. It is preferred that the openings slope upwardly and toward the outlet end of the upper chamber so that air passing through the openings into the upper chamber is directed upwardly and toward the outlet end of the upper chamber to cause particles in the upper chamber to move toward the outlet end. It is preferred that the partition comprise a plurality of spaced-apart plates, the spaces between the plates forming the openings.

Particles of an expandable lightweight aggregate material are introduced into the upper chamber through an inlet port and exit the upper chamber though an outlet port. Both inlet and outlet ports comprise means, preferably valve means, for regulating the rate at which the particles are introduced to and removed from the upper chamber. Means for generating and introducing a stream of hot air into the lower chamber are also provided. Preferred means comprise a blower for generating a stream of air and a burner for heating the air stream.

The apparatus further comprises means for independently regulating the velocity of the air passing through separate sections of the partition so that the velocity of air passing through the section of the partition adjacent the outlet end of the upper chamber is less than the velocity of the air passing through the section of the partition adjacent the inlet end.

Preferred means for independently regulating the air velocity passing through separate sections of the partition comprises one or more vertical dividers which subdivide the lower chamber into two or more separate compartments, each compartment being associated with a separate section of the partition. An inlet air duct directs hot air from the blower and burner into each compartment. Each inlet air duct comprises a means, e.g., a damper, for regulating the flow of air through that inlet duct. The air flow regulating means of the inlet air ducts are adjusted to provide greater air flow through the compartment and hence, through the section of the partition adjacent the inlet end of the upper chamber than through the compartment and the section of the partition adjacent the outlet end.

Hot air passing into the upper chamber to fluidize and expand the particles exits the upper chamber through an air outlet opening. Such effluent air is preferably returned to the blower through a recirculating duct.

BRIEF DESCRIPTION OF THE DRAWINGS

These and other features and advantages of the present invention will be better understood by reference to the following detailed description when considered in conjunction with the accompanying drawings wherein:

FIG. 2 is an end cross-sectional view of the apparatus shown in FIG. 1 through line 2—2; and FIG. 3 is a top cross-sectional view of the apparatus shown in FIG. 1 along line 3—3.

DETAILED DESCRIPTION

Figure 1:
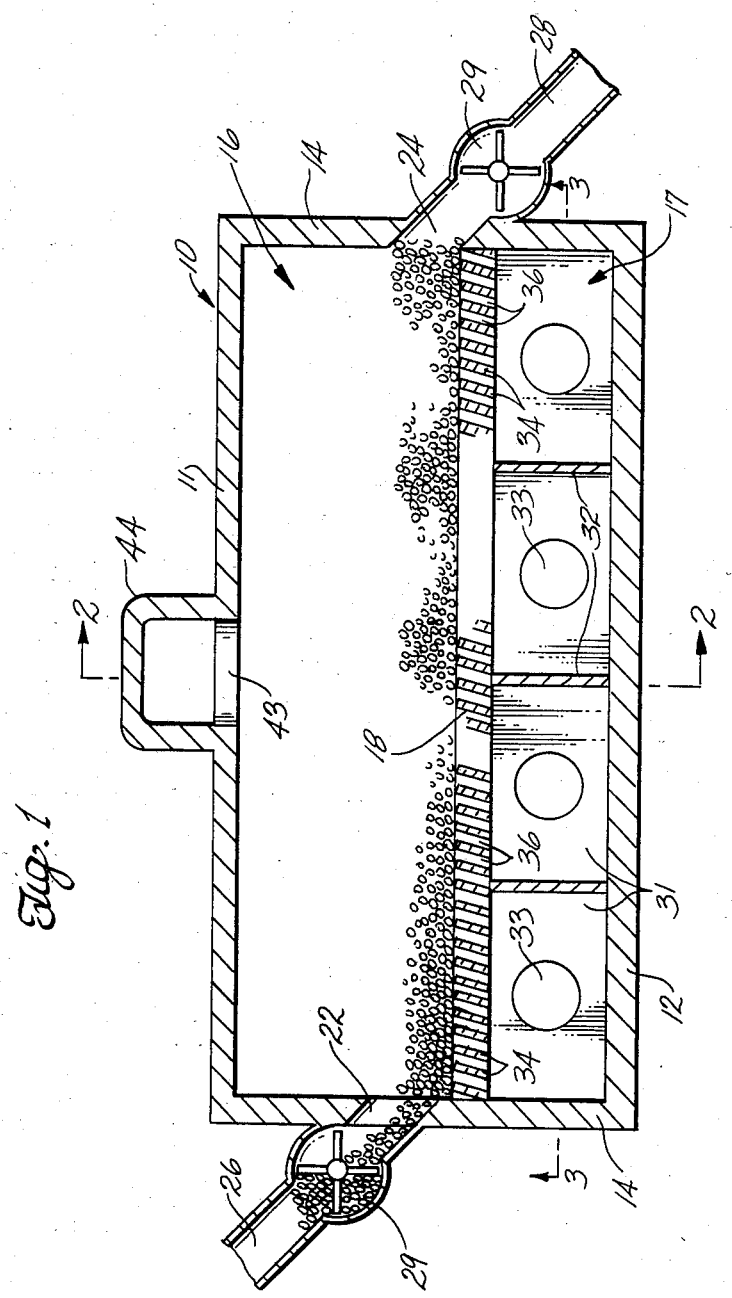
FIG. 1 is a side cross-sectional view of a preferred apparatus.

In accordance with the present invention, there is provided a method and apparatus for expanding particles of raw expandable lightweight aggregate material to form lightweight aggregate for use in concrete and the like.

With reference to FIGS. 1-3, a preferred apparatus for continuous expansion of such particles comprises an elongated housing 10 having generally horizontal top and bottom walls 11 and 12 respectively, a pair of generally vertical side walls 13 and a pair of generally vertical end walls 14. The interior of the housing 10 is divided into an upper chamber 16 and a lower chamber 17 by a generally horizontal partition 18.

The upper chamber 16 has an inlet opening 22 at its inlet end and an outlet opening 24 at its outlet end. Particles are introduced into the upper chamber 16 through the inlet opening 22 by means of an inlet port 26. Particles adjacent the outlet end 23 of the upper chamber 16 exit the upper chamber 16 through outlet opening 24 and air outlet port 28.

The inlet port 26 and outlet port 28 each comprise a star valve 29 for regulating the rate at which particles pass therethrough, and hence, the rate at which particles pass through the upper chamber 16. The star valves 29 are adjusted so that the particles are maintained within the upper chamber 16 for the desired length of time.

The lower chamber 17 is divided into a plurality of compartments 31 by generally vertical dividers 32. Each compartment has an air inlet opening 33 in the side wall 13 through which hot air is introduced.

The partition 18 is formed by a plurality of plates 34, uniformly spaced apart to form slots 36 which allow air, which is introduced into the lower chamber 17, to flow into the upper chamber 16. The plates 34 are preferably made of firebricks. The plates 34 are preferably spaced apart so that the width of the slots 36 is sufficiently small to prevent particles in the upper chamber 16 from falling into the lower chamber 17.

The plates 34, and hence the slots 36 between the plates 34, are canted toward the outlet end 33 of the upper chamber 16 so that air flowing through the slots 36 is directed not only upwardly but toward the outlet end of the upper chamber 16. The angle of the plates 36 and the slots 34 is selected to cause the particles to move from the inlet end 21 of the upper chamber 16 to the outlet end 23 at a rate which maintains a generally uniform depth of the particle bed throughout the upper chamber 16.

The apparatus further comprises a blower 37 for producing a stream of air and a burner 38 for heating the stream of air to the desired temperature. The stream of hot air thus produced is delivered to the compartments 31 of the lower chamber 17 through an air manifold 39 which branches into a plurality of air inlet ducts 41. A separate air inlet duct 41 extends to each air inlet opening 33 of the lower chamber 17.

Each inlet air duct 41 comprises a damper 42 for adjusting the flow of air through that air inlet duct 41 and hence, through the compartment 31 associated with that air inlet duct 41 and the section of the partition 18 associated with that compartment 31. The dampers 42 can thus be used to regulate the velocity of air entering the upper chamber 16 from each compartment 31 of the lower chamber 17. Thus, by means of the dampers 42 and the dividers 32, the velocity of air entering the upper chamber 16 can be adjusted to be lower at the outlet end of the upper chamber 16 than at the inlet end to accommodate a decrease in density of the particles at the outlet end.

Hot air introduced into the upper chamber 16 exits the upper chamber 16 through an air outlet opening 43 into a return duct 44. The return duct 44 channels the hot air back to the blower 37 to minimize the amount of energy required by burner 38 to heat the stream of air from the blower 37 to the desired temperature before it is again introduced into the lower chamber 17.

A primary application of the above apparatus is in the production of lightweight aggregate from particles of expandable shale. Such particles are typically formed from crushed shale which has been compressed, then extruded and finally cut to the desired size.

In such an application the shale particles are introduced into the upper chamber 16 of the apparatus through the inlet port 26 to form a particle bed. The blower 37 and burner 38 are activated to provide a stream of hot air which fluidizes the shale particles and causes the particles to move toward the outlet end of the upper chamber 16.

The temperature of the air is sufficient to cause the particles to become plastic and fully expand within the time that the particles are in the upper chamber 16. For shale particles, the temperature is preferably maintained within the range of from about 2030° to about 2070° F.

Temperatures below about 2030° F. are not preferred because at such temperatures, shale particles tend to not become sufficiently plastic to fully expand. Temperatures above 2070° F. are also not preferred because the particles tend to become burned on the outer surface before the particles fully expand at their centers.

The star valves 29 regulate the contact time, i.e., the length of time that the shale particles are maintained in the upper chamber 16. When the temperature of the air stream is maintained within the range of 2030° to 2070° F., it is preferred that the star valves are adjusted to provide a contact time in the range of 100 to 120 seconds.

For such temperatures, a contact time less than about 100 seconds is not presently preferred because it has been found that such times tend to be insufficient to allow the particles to fully expand. Contact times greater than 120 seconds are not preferred because the expanded particles tend to become viscid and stick together.

As the shale particles are contacted with the hot air and move toward the outlet end of the upper chamber 16, they become plastic and expand. As the particles expand, they become lighter or less dense, and offer less resistance to the flow of air. Thus, to maintain a uniformly fluidized bed, i.e., one of generally uniform depth and turbulence, the velocity of the air passing into the upper chamber 16 from each compartment 31 of the lower chamber 17 is adjusted by means of dampers 42 to provide such uniform fluidization. This means that the dampers 42 are adjusted so that the velocity of air from compartments 31 nearer the outlet end of the upper chamber 16 is less than that from compartments 31 nearer the inlet end to compensate for the decrease in density of the particles as they travel toward the outlet end.

This effectively avoids a situation wherein a disproportionately large percentage of the air flow produced by the blower passes through the portion of the particle bed adjacent the outlet end of the upper chamber 16 which comprises the lighter, expanded particles. Such a situation could result in violent fluidization at the outlet end and too little fluidization at the inlet end.

The velocity of the air entering the upper chamber 16 from each compartment 31 must be sufficient to fluidize the particles and will depend on such factors as particle size and density. Such velocities are preferably selected on a trial and error basis to provide generally uniform fluidization and the degree of turbulence which is desired. For economic reasons, it is presently preferred that the velocities be about the minimum required to fluidize the particle bed with sufficient turbulence to prevent the particles from sticking together.

The present invention offers significant advantages over conventional systems. Using the process of the present invention, the time required to expand the particles may be one-tenth or less of the time required by conventional processes. This translates into a tremendous savings in energy consumption and overall production costs. Further, the cost of equipment for such a process is considerably less than that required by conventional rotary kiln processes.

The preceding description has been presented with reference to the presently preferred embodiments of the invention. Workers skilled in the art and technology to which this invention pertains will appreciate that alterations and changes in the described method and apparatus can be practiced without meaningfully departing from the principles, spirit and scope of this invention.

For example, it is apparent that the method of this invention is applicable to any type of expandable particles, not just shale particles. Preferred contact times, temperatures, and air velocities will vary according to the type and particle size of the material being expanded.

With respect to the apparatus, it is apparent that the size and shape of the upper and lower chambers can vary. Any means for introducing and removing particles from the upper chamber may be used. Likewise, any means for regulating the contact time of the particles in the upper chamber can be used.

In the exemplary embodiment of the invention shown, there are four compartments 31, all being generally the same size. It is apparent that more or fewer compartments may be used, or that compartments of unequal sizes may be used, if desired.

The partition separating the upper and lower chambers has been described as a plurality of spaced-apart plates. A single perforated plate may work equally well. Further, the need for compartmentalizing the lower chamber can be obviated by adjusting the number and/or size of the openings in the partition, i.e., a smaller number of openings and/or smaller opening size at the outlet end of the partition as compared to the inlet end.

While preferred, it is not necessary for the openings in the partition to be inclined toward the outlet end of the upper chamber. By virtue of introduction at the inlet end and removal at the outlet end, there is a natural migration of particles toward the outlet end.

Other features of the apparatus may also vary. For example, while preferred, a return duct to recirculate hot air to the blower is not needed. Likewise, any means for generating a stream of hot air can be used, not just the combination of a blower and burner. Further, more than one such hot air generating means may be used, if desired.

Accordingly, the foregoing description should not be read as pertaining only to the precise structures and methods described, but rather should be read consistent with and as support for the following claims which are to have their fullest fair scope.

What is claimed is:

1. A process for expanding particles of an expandable lightweight inorganic aggregate material comprising:
   providing a fluidizing chamber having an inlet end and an outlet end;
   introducing non-expanded particles into the inlet end of the fluidizing chamber;
   fluidizing the particles with an upwardly flowing stream of hot air having a temperature sufficient to expand the particles for a time sufficient for the particles to expand wherein fluidization of the particles causes the particles to move toward the outlet end of the fluidizing chamber, to thereby provide a particle bed comprising non-expanded particles at the inlet end of the fluidizing chamber and expanded particles at the outlet end of the fluidizing chamber;
   adjusting the flow of the hot air stream so that the velocity of the air fluidizing expanded particles at the outlet end of the chamber is sufficiently less than the velocity of air fluidizing non-expanded particles at the inlet end of the chamber to thereby maintain generally uniform fluidization of the particle bed; and
   removing expanded inorganic particles from the outlet end of the chamber.

2. A process as claimed in claim 1 wherein the hot air is directed upwardly and toward the outlet end of the chamber to thereby fluidize the particles and horizontally transport the particles toward the outlet end of the chamber.

3. A process as claimed in claim 1 wherein the lightweight aggregate material is shale.

4. A process as claimed in claim 3 wherein the temperature of the hot air stream is from about 2030° to about 2070° F.

5. A process as claimed in claim 4 wherein the particles are contacted with the hot air stream for a time of from about 100 to about 120 seconds before removal.

6. An apparatus for expanding particles of an expandable lightweight inorganic aggregate material comprising:
   a housing comprising:
      an upper chamber having an inlet end and an outlet end;
      a lower chamber below the upper chamber;
      a partition separating the upper chamber from the lower chamber, said partition having a plurality of openings through which air introduced into the lower chamber can pass into the upper chamber;
   means for introducing the particles into the inlet end of the upper chamber;
   means for removing particles from the outlet end of the upper chamber;
   means for generating a stream of hot air;
   means for introducing the stream of hot air into the lower chamber; and
   means for adjusting the velocity of air passing through at least the openings of the partition adjacent the outlet end of the upper chamber so that the velocity of air passing through openings adjacent the outlet end of the upper chamber is sufficiently less than the velocity of the air passing through openings adjacent the inlet end of the upper chamber to assure generally uniform fluidization of particles within the upper chamber.

7. An apparatus as claimed in claim 6 wherein the openings in the partition are inclined so that air passing through the openings into the upper chamber flows upwardly and toward the outlet end of the upper chamber.

8. An apparatus as claimed in claim 6 wherein the means for introducing the particles into the inlet end of the upper chamber comprises an inlet port in communication with the inlet end of the upper chamber, said inlet port comprising means for regulating the flow of particles through the inlet port.

9. An apparatus as claimed in claim 6 wherein the means for removing particles from the outlet end of the upper chamber comprises an outlet port in communication with the outlet end of the upper chamber, said outlet port comprising means for regulating the flow of particles through the outlet port.

10. An apparatus as claimed in claim 6 wherein the partition comprises a plurality of spaced-apart plates.

11. An apparatus as claimed in claim 10 wherein the plates are firebricks.

12. An apparatus as claimed in claim 6 wherein the means for adjusting the air flow through at least the openings of the partition adjacent the outlet end of the upper chamber comprises at least one divider for subdividing the lower chamber into compartments, each compartment having an inlet air duct for receiving a portion of the stream of hot air, and wherein at least the compartment adjacent the outlet end of the upper chamber comprises means for regulating the flow of air through its inlet air duct.

13. An apparatus as claimed in claim 6 wherein the means for generating a stream of hot air comprises a blower for generating a stream of air and a burner for heating the stream of air.

14. An apparatus for expanding particles of an expandable lightweight inorganic aggregate material comprising:
a housing comprising:
an upper chamber having an inlet end and an outlet end;
a lower chamber below the upper chamber;
a partition separating the upper chamber from the lower chamber, said partition having a plurality of openings through which air introduced into the lower chamber can pass into the upper chamber;
at least one divider for subdividing the lower chamber into two or more compartments;
means for introducing particles into the inlet end of the upper chamber at a select rate;
means for removing particles from the outlet end of the upper chamber at a select rate;
a blower for generating a stream of air;
a burner for heating the generated stream of of air; and
an air inlet duct associated with each compartment of the lower chamber for delivering a portion of the heated air stream to that compartment, each air inlet duct comprising means for regulating the flow of air therethrough.

15. An apparatus as claimed in claim 14 wherein the openings in the partition are inclined so that air passing through the openings into the upper chamber flows upwardly and toward the outlet end of the upper chamber.

16. An apparatus as claimed in claim 14 wherein the partition comprises a plurality of spaced-apart plates.

17. An apparatus as claimed in claim 16 wherein the plates are firebricks.

18. An apparatus as claimed in claim 14 further comprising a return duct for recirculating hot air from the upper chamber to the blower.

* * * * *